Figure 1:
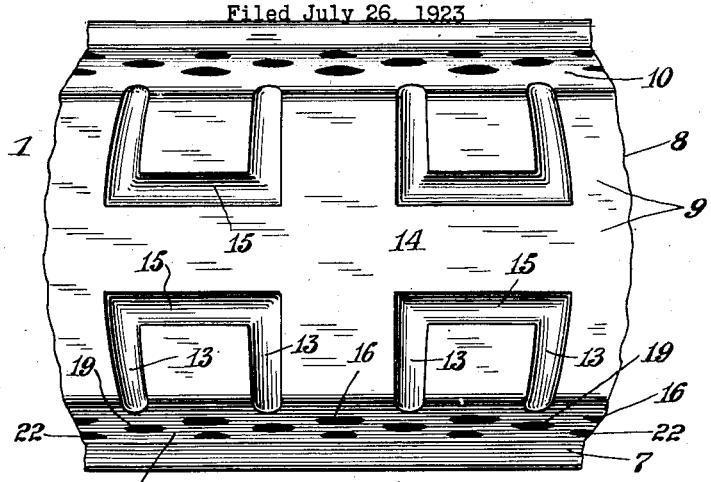

May 22, 1928.

F. A. SEIBERLING

VEHICLE TIRE

Filed July 26, 1923

1,670,827

Inventor
Frank A. Seiberling
by
Rogers, Kennedy & Campbell
Att'ys

Patented May 22, 1928.

1,670,827

UNITED STATES PATENT OFFICE.

FRANK A. SEIBERLING, OF AKRON, OHIO, ASSIGNOR TO SEIBERLING RUBBER COMPANY, A CORPORATION OF OHIO.

VEHICLE TIRE.

Application filed July 26, 1923. Serial No. 653,827.

This invention is a novel vehicle tire and relates especially to the type known as the cushion tire, which is constructed of an elastic material or rubber and is therefore resilient, but is of a solid construction in the sense that it is not of the inflated or pneumatic type and is therefore non-puncturable.

The general object of the present invention is to secure to the maximum degree the several desiderata for tires of the cushion type. A specific object is to give maximum grip upon the road surface and thereby increased tractive power as well as non-skid qualities. A special object is to afford non-skidding qualities which will be perpetual, that is, will be present throughout the wear of the tire from the original tread surface to the limit to which wear is practical. Another object is to give maximum resilience or flexibility to the tire. A special object is to give such resilience that the tread surface will have a capability of absorbing to a maximum degree, obstacles such as stones, and the shock upon impact therewith. Another object is to afford a cushion tire which will maintain itself in good condition and with ventilation to prevent overheating. A further object is to secure a self cleaning operation of the interior spaces. Further objects and advantages will appear in the hereinafter following specification of one form or embodiment of the invention, or will be apparent to those skilled in the art.

To the attainment of the above referred to objects and advantages, the present invention consists in the novel vehicle tire and the novel features of construction, combination, operation, arrangement and design as herein described or illustrated.

As an example of a vehicle tire of the cushion type, I refer to my prior Patent No. 876,597 of January 14, 1908, which shows to some extent certain of the qualities hereinabove referred to and upon which the present invention may be considered an improvement.

In common with said prior patent, the present invention comprises a cushion tire of resilient vulcanized rubber, with its body cross section of a configuration with an ample base or inner surface, and convex tread or outer surface, and commensurate depth; an initial circumferential series of transverse tread notches, recesses or grooves for traction and non-skid purposes; and transverse, flared holes or openings extending through the body for added resilience and cushioning effect and ventilation. The prior structure however comes far from attaining the advantages and qualities of the present structure, which is distinguished in each of the following disclosed respects or features, and more especially in the combination of some or all of the following, as will be more particularly set forth in the claim.

The tread portion of this invention is shown as having the spaced transverse grooves or notches relatively shallow, and preferably arranged confined to the sides to avoid interrupting the mid-tread area. Thereby the tire is stabilized and maintained of ample strength, as it would not be with notches of such great depth as to afford great resilience as in the prior patent.

The transverse holes are not merely preferably flared, to give self cleaning and insure ventilation, but are shown provided in two or more tiers or series located respectively at different distances from the tread, affording great resilience without undue weakening or unstablizing of the tire, and moreover permitting the tread notches to be of shallow character, as stated.

The cushioning and ventilating transverse holes are not merely in several series or rows between the tread and base, but are shown in staggered relation to each other, that is, the holes in any row are circumferentially offset with relation to those in the adjacent row or rows, thus giving maximum resilience and cushioning with minimum interruption and weakening of the body of rubber, and without impairing longitudinal strength. Moreover, preferably, the staggered relation is carried outward to the tread notches or grooves, shown staggered with relation to the outermost series of holes, giving the stated advantage to increased degree.

The staggered series of holes are preferably graduated in size, as shown, that is, an outer series consists of holes substantially larger than a series inwards thereof; this arrangement increasing the ability to absorb shocks.

The several series of holes are not merely in staggered relation, but are preferably arranged in overlapping relation, that is to say, for example, a circumference through the innermost points of the first or outermost series of holes will substantially intersect the holes of the second or next inward series or row. Moreover, preferably, the overlapping staggered arrangement is continued to the tread notches or grooves, the inner points of which mark a circumference which intersects the first or outer series of holes. By these relations a perpetual non-skid tractive surface is maintained as the tire wears, for as the wear obliterates each series of notches or holes it discloses a new series, providing always an interrupted tread.

Figure 2:
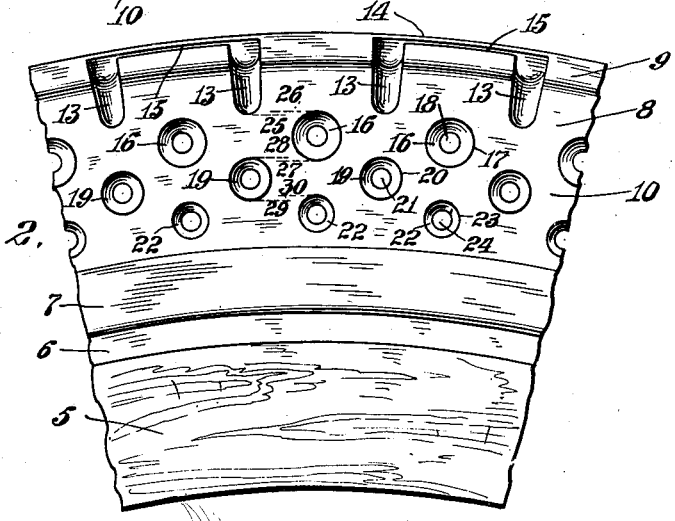
Figure 3:
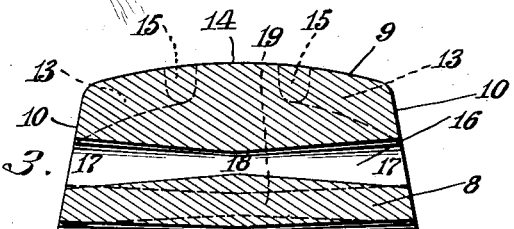
Figure 4:
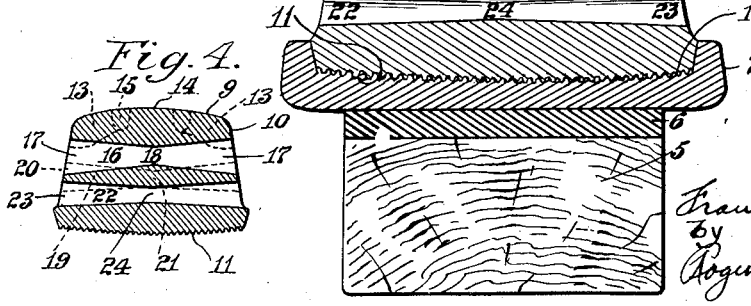

In the accompanying drawings Fig. 1 may be considered a partial top view looking down upon the tread of a vehicle tire embodying the present invention; Fig. 2 is a side elevation of the same; and Figs. 3 and 4 are transverse sections.

The tire may be applied to different types of wheels, for example, a wheel having a wood rim 5, surrounded by a strip or sheath 6, carrying a metallic rim 7. The metallic rim is shown as flanged at the opposite sides forming a recess to receive the tire, and the rim may be of any desired type, for example a demountable rim. The rim may be collapsible when demounted so as to permit assembly with and disassembly from the tire, if desired.

The tire may be said to comprise a body 8 of solid rubber, having at the outside a tread surface 9, preferably convex, two opposite sides 10 preferably inclined toward the tread, and a base or inner surface 11 which engages directly with the rim 7. The base and rim may be ribbed as indicated at 12 and united by vulcanization.

The tread surface is shown as provided with spaced apart transverse notches or grooves 13. These constitute initial traction or non-skid recesses. The notches 13 are not only spaced from each other circumferentially, but are arranged at opposite sides of the tread, with a space between, so that the notches 13 do not extend entirely across the tread. This avoids interrupting the continuity of the middle circumference of the tread and provides a continuous central surface or mid rib 14. It will be noted further that the notches 13 are relatively shallow instead of having the extreme depth shown in the prior patent, and resulting in a more stable and satisfactory tire. The ends of the several notches 13 may be interconnected by a series of longitudinal grooves 15 arranged circumferentially adjacent to the mid-tread surface 14 as shown, thus emphasizing the nature of this surface and increasing the non-skid qualities of the tire.

Besides the notches, the tire hereof is shown as provided with a plurality, namely three, series of apertures or through holes, preferably open from one side of the tire to the other, and tapered. Thus the first or outer series of holes 16 is shown in circumferential arrangement, substantially inwards of the tread surface. Each hole 16 is shown as having enlarged or flared exits 17 with a constricted part 18 at the middle.

Similarly the second or middle series of holes 19 is arranged upon a circumference yet further inward, each hole having enlarged ends 20 and a reduced center 21, giving the same double flared construction as the first series. The third or innermost series of holes 22 may be of similar form with flared ends 23 and reduced center 24.

The several series of holes cooperate with each other and with the notches to give maximum resilience without undue weakening of the tire, which is rendered very stable by this structure, the resilience afforded by the numerous holes being such as to permit the tread notches 13 to be of slight depth as stated. The several series of holes not merely give resilience, but insure ventilation of the tire, keeping the rubber from overheating, and therefore in good condition. The flared character of the holes affords a self cleaning action. Every compression gives an ejecting action, the flare becoming constricted and forcing any foreign matter outwardly, thus tending to preserve the open character of the holes and the described ventilating effect.

It will be further noted that the several series of holes are in staggered relation with each other. Thus the holes 19 are offset or spaced between the positions of the holes 16, and the holes 22 are staggered in a similar manner.

By this arrangement maximum resilience and cushion effect are attained with minimum interruption and weakening of the body of rubber and without impairing its longitudinal strength. The notches 13 also are shown staggered with relation to the holes.

Further, the holes are not merely arranged in series, and staggered as stated, but are preferably graduated in size, the outer series 16 consisting of holes substantially larger than those in series 19 and 22. This greatly increases the ability of the tire to absorb shocks because maximum flexiblity is given in the neighborhood of the tread, so that upon striking a stone or similar obstruction the tire is able to yield locally and minimize the shock.

In addition to these combined features, the several series of holes are shown in overlapping relation, as already explained. This overlapping relation is carried outward to the tread notches. Thus the circumference indicated at 25, through the innermost points of the notches 13, is further inward than the circumference 26 through the outermost points of the holes 16. So also the circumference 27 through the innermost points of the holes 16 is further inward than the circumference 28 through the outermost points of the holes 19; and the circumference 29 through the innermost points of the latter is further inward than the circumference 30 through the outermost points of the holes 22. By this arrangement a non-skid or traction surface is always presented, inasmuch as the wear of the tire, when it obliterates one series of notches or holes, operates to uncover and bring into action a new series.

Fig. 4 is a view like Fig. 3 of a modified tire structure in which the successive overlaps are of greater extent, so that one series of notches is disclosed and well developed before the preceding series is worn off.

In each form, the illustrated tire is advantageous in its reduced tendency to side-roll, a decided difficulty and danger with some chambered tires running at high speeds. This advantage is due to the fact that the systematically arranged transverse holes are conical, with their smaller ends in the middle, so that the masses of rubber between the holes take pyramidial forms, affording, as it were, a connected series of pyramids, with their bases in the vertical center line of the tire, giving therefore strong bracing through the center, and without sacrificing resilience.

It will thus be seen that there has been described a vehicle tire of the cushion type embodying the principles and attaining the advantages of the present invention. Since various matters of construction, arrangement, operation, design and detail may be variously modified without departing from the principles involved it is not intended to limit the invention except in so far as set forth in the appended claim.

What is claimed is:

A cushion tire having its outer surface formed at the two sides with transverse tread recesses of moderate depth and terminating short of the mid tread surface, and with circumferential connecting grooves, and the body of the tire formed with two or more series of transverse open, and double-flared holes, the same graduated in size, with the larger holes nearer the tread, and arranged in staggered and overlapping relation to each other and to the tread recesses.

In testimony whereof, I have affixed my signature hereto.

FRANK A. SEIBERLING.